March 7, 1944.  H. B. DONLEY  2,343,754
SEALED TYPE TAIL, STOP AND DIRECTION SIGNAL
Filed Sept. 11, 1940
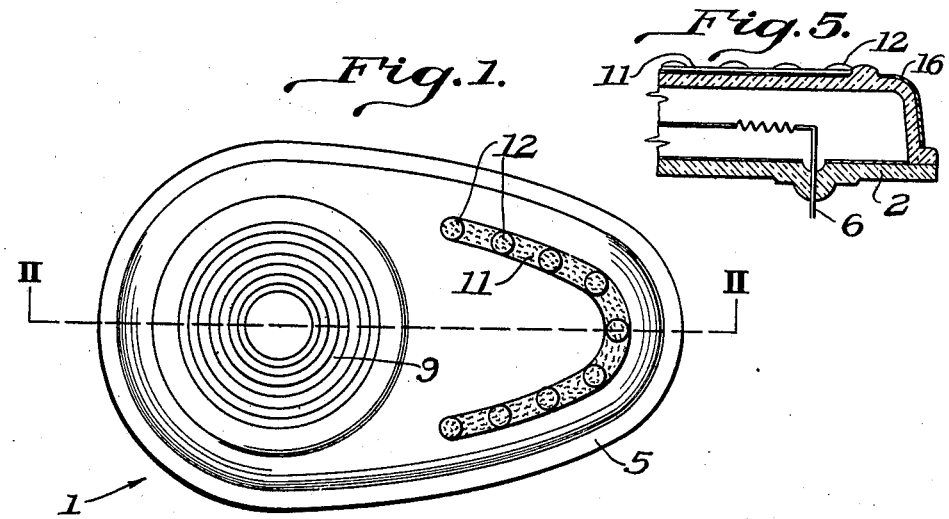
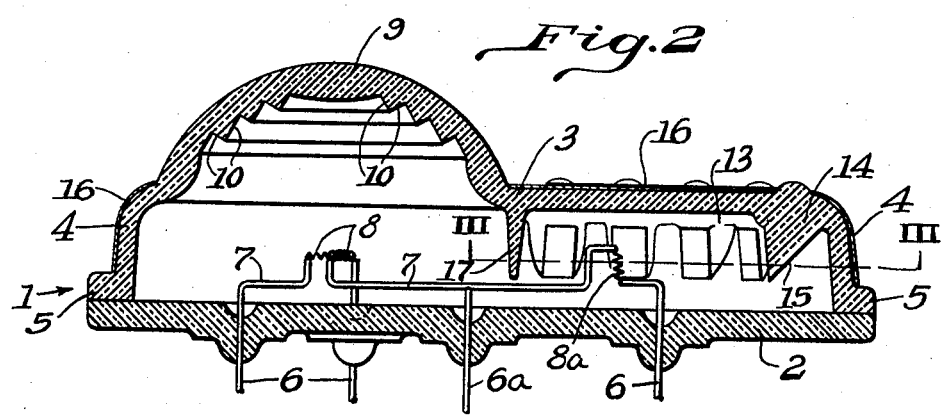
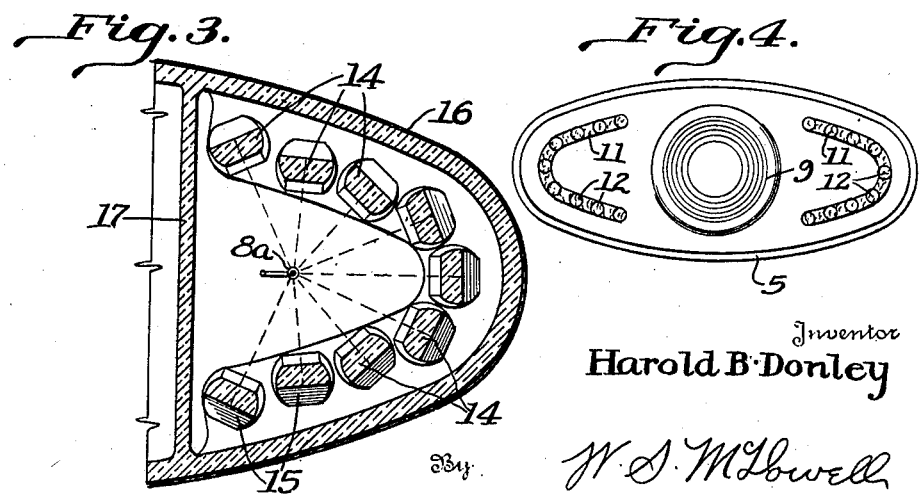
Inventor
Harold B. Donley
By W. S. McDowell
Attorney Patented Mar. 7, 1944

2,343,754

UNITED STATES PATENT OFFICE 2,343,754

SEALED TYPE TAIL, STOP, AND DIRECTION SIGNAL

Harold B. Donley, Columbus, Ohio

Application September 11, 1940, Serial No. 356,340

2 Claims. (Cl. 177—329)

This invention relates to motor vehicle signal-producing lamps, namely, tail lamps, stop lamps, direction or maneuver indicating lamps, parking lamps and the like, as distinguished from head lamps or other strong light projectors having parabolical reflectors.

Signal lamps of the type indicated are usually formed to provide metallic casings having arranged therein one or more incandescent bulbs which, when energized, enable light to be emitted through prismatic or plain lenses positioned in suitably arranged openings in the lamp casings. Such lamps are objectionable in several respects, among which are: their general inefficiency for the purposes for which they are adapted; their reduced or impaired effectiveness as a signalling means after a certain period of use and exposure to the elements; in many instances, their unsightly appearance; their employment of numerous separable parts which are apt to become out of order, loosened, lost or broken; and their relative high manufacturing costs.

The present invention, therefore, has for certain of its objects the provision of an efficient and relatively inexpensive signal lamp, one which will maintain its efficiency as a light emitting and signal affording means throughout its effective life; a signal lamp comprising a unitary structure devoid of separable or relatively movable parts; a signal lamp which may be economically manufactured; and one which will furnish an attractive accessory when used in connection with motor vehicles.

The invention consists primarily in the provision of an improved signal lamp for motor vehicles wherein the lamp is formed to comprise a casing formed from glass or other vitreous materials, the casing being composed primarily of two sections which are inseparably joined along their meeting edges by fusion so as to form an internal, hermetically sealed filament-containing chamber, one of said sections having integrally formed therewith light disseminating lenses or prisms which constitute a disseminating means for effecting the issuance of light from the casing in desired patterns or colors.

The invention further comprehends the provision of a signal lamp having a unitary vitreous casing with an internal filament chamber, and wherein one of the walls of the casing is provided with integral lens means so disposed as to constitute a combined tail, stop and direction signal light producing means.

Another object resides in providing the cover of the lamp with a plurality of angularly related surfaces to reflect light rays directed toward the lamp when the filaments therein are not energized, thus providing a warning signal which will at all times be operative.

Other objects will be made apparent by the following description and the accompanying drawing in which a lamp embodying the principles of the present invention has been shown in detail.

In the drawing:

Fig. 1 is a front elevational view of a sealed type signal lamp formed in accordance with the present invention;

Fig. 2 is a horizontal sectional view taken on the plane indicated by the line II—II of Fig. 1;

Fig. 3 is a detail vertical sectional view taken on the plane indicated by the line III—III of Fig. 2;

Fig. 4 is a front elevational view of a slightly modified form of signal lamp;

Fig. 5 is a horizontal sectional view disclosing a further modified form of my improved signal lamp.

In the form of the lamp shown in Figs. 1 to 3, inclusive, the same comprises a hollow glass body 1 having a rear wall 2 and a front wall 3, the latter being provided with a rearwardly directed flange 4 which serves to space the front and rear walls. The free edge of the flange 4 terminates in a laterally directed lip 5, the lip and flange combining to form a smooth edge for engagement with the front surface of the rear wall. The front wall and the flange serve as a cover for the lamp and when this cover is secured by fusion to the rear wall, a hollow casing is formed from which the air may be exhausted to produce a hermetically sealed body.

Prior to sealing the body, the rear wall has a plurality of wires 6 secured thereto, these wires extending through the rear wall and being provided at their inner ends with lateral branches 7, the end portions of which terminate in spaced order. Electrically energized lamp filaments 8 are disposed between the branches 7 and are connected therewith to receive current introduced to the lamp through the wires 6. One wire 6a of the group extends from the lamp and is connected with the metallic portion of a vehicle to form a ground, while the other wires extend from the lamp to the vehicle battery and have switch means positioned therein to control the flow of current to the various filaments. The filaments are in the form of coils and a pair thereof have their longitudinal axes disposed in parallel relation with the rear wall. These filaments are disposed adjacent to one end of the rear wall. The other filament 8a has its longitudinal axis at right angles to the rear wall and this filament is disposed in closer relation to the opposite end of the rear wall. By means of the switch members disposed in the lines 6, the filaments may be selectively energized to convey the desired signals.

In registration with the pair of filaments adjacent to the larger end of the rear wall, the front wall is formed with an outwardly directed globe-like lens portion 9, the inner surface of which is provided with a plurality of sets of angularly related surfaces 10. The central portion of the lens is convex on both inner and outer sides to produce a magnifying portion which is in registration with the filaments 8 and serves to increase the brilliancy thereof to a limited extent. The light rays generated by the filaments 8 will pass directly through the central portion of the lens and be perceptible to an observer looking toward the front wall of the lamp.

The lens 9 is positioned at one end of the front wall and the opposite end is provided with a modified arrow head 11 which, in the present instance, comprises a pad formed on the outer side of the wall 3. This pad has a plurality of buttons 12 spaced longitudinally thereof, the exterior surfaces of the buttons and the pad being stippled to diffuse the rays of light passing therethrough. The inner surface of the front wall is also provided with a pad 13 in registration with the pad 11 which is provided with a plurality of prism-like elements 14, the axes of which are disposed substantially at right angles to the wall 3. Each of the prisms is disposed substantially in registration with a button 12 and has an angular surface 15 formed at the inner end. The prisms also have a plane surface on the side opposite the angular surface, these surfaces being so arranged that transverse lines extending thereacross will be parallel. The surfaces are also so arranged on the prisms that the transverse lines will be normal to planes passing through the longitudinal axis of the filament 8a. By this arrangement, rays of light emanating from the filament 8a, when it is energized, will pass through the prisms and be reflected by the surfaces 15 in paths substantially parallel to the longitudinal axes of the prisms and will pass out of the casing through the pad and buttons 11 and 12.

To limit the flow of light to these paths, the outer surface of the cover 3 may be coated with enamel or other suitable material 16, the coating being omitted on the pad and buttons and the globe-like lens 9. To prevent the rays from the filaments 8 from striking the surfaces 15 and being reflected thereby to give a false indication, the front wall 3 has a light impervious baffle 17 extending across the inner face between the prisms and the globe-like lens. This baffle forms an integral part of the cover and may be coated with enamel or it may be formed from a vitreous material of an opaque character. Through the provision of the laterally directed lip at the edge of the flange 4, the lamp may be secured to the vehicle in any suitable manner.

When the lamp possesses the configuration shown in Figs. 1, 2 and 3, it will be necessary to employ two lamps at the rear of a vehicle, one being as illustrated and the other being reversed so that the arrow head will be pointed in the opposite direction. It is obvious that the lamp could be formed as shown in Fig. 4 with both arrow heads incorporated in the same cover. When this type of lamp is employed, it will be secured to the rear portion of the vehicle at approximately the central portion where it will be visible to the drivers of vehicles following the one bearing the lamp.

In the form of the invention depicted in Fig. 5, the prisms 14 are omitted and the light emitting signal design is produced by limiting the application of the coating 16 on the outer surface of the lamp casing to produce symbols of desired configuration. In this form of my invention, the rear section 2 of the casing has its inner surface silvered to form a more efficient light reflecting means.

In view of the foregoing, it will be seen that the present invention provides a unitary signal lamp for motor vehicles, wherein the casing of the lamp is formed from a vitreous or other moldable material capable of being united so as to produce a unitary structure in which is formed the hermetically sealed filament-containing chamber. The lamp may be economically manufactured and will furnish an efficient light-emitting means when used as a tail light, stop light, direction indicating light or as a parking light. Its usefulness in these capacities, or in any one of them, remains unimpaired and fully effective during the full life of the light sources provided in the hermetically sealed chamber. If these light sources fail, the lamp which in certain respects is an enlarged form of an incandescent lamp, may be easily and economically replaced as an entire unit.

What is claimed is:

1. A combined tail and direction signalling lamp for motor vehicles comprising a base member and a cover member forming a hermetically sealed casing containing light filaments therein, a portion of said cover member having a convex light transmitting lens, another portion of said cover member being impervious to light except for a predetermined area consisting of prismatic means extending into said casing, a light impervious baffle in said casing separating the internal portions defining the convex lens and the said prismatic means, said prismatic means being disposed in an arcuate member around a light filament as a focal point so as to radiate light therefrom in substantially uniform intensity through the cover member.

2. A signal lamp comprising a vitreous back wall member, a plurality of electrically energized filaments supported in spaced relation by said back wall member, a vitreous light transmitting cover member joined with said back wall member to form a hollow lamp casing, said casing being hermetically sealed, a lens forming a part of said cover member, said lens being in registration with one of said filaments, a plurality of prisms integrally formed with said cover member and projecting into the interior of said lamp casing, means on one of said members cooperating with the other member for forming an impervious baffle between the lens and prisms, said prisms having inner ends in registration with the other of said filaments, and raised pad means on the exterior of said cover member substantially in axial registration with said prisms, said pads and prisms being grouped in predetermined character-forming order adjacent to a substantially light impervious portion of the cover member.

HAROLD B. DONLEY.